US010411555B2

(12) United States Patent
Kim et al.

(10) Patent No.: US 10,411,555 B2
(45) Date of Patent: Sep. 10, 2019

(54) ACTUATOR MODULE

(71) Applicant: ROBOTIS CO., LTD., Seoul (KR)

(72) Inventors: Byoung Soo Kim, Seoul (KR); Wook Jang, Gwangmyeong-si (KR); In Yong Ha, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 141 days.

(21) Appl. No.: 15/749,501

(22) PCT Filed: Mar. 31, 2016

(86) PCT No.: PCT/KR2016/003351
§ 371 (c)(1),
(2) Date: Feb. 1, 2018

(87) PCT Pub. No.: WO2017/007112
PCT Pub. Date: Jan. 12, 2017

(65) Prior Publication Data
US 2018/0219447 A1    Aug. 2, 2018

(30) Foreign Application Priority Data
Jul. 3, 2015   (KR) .................. 10-2015-0095427

(51) Int. Cl.
*H02K 7/00* (2006.01)
*H02K 5/22* (2006.01)
(Continued)

(52) U.S. Cl.
CPC ................ *H02K 5/225* (2013.01); *B25J 9/08* (2013.01); *B25J 9/102* (2013.01); *B25J 9/126* (2013.01);
(Continued)

(58) Field of Classification Search
CPC . H02K 5/22; H02K 11/30; H02K 7/00; H02K 7/116; H02K 7/003; H02K 5/225;
(Continued)

(56) References Cited

U.S. PATENT DOCUMENTS 5,313,129 A * 5/1994 Stewart ............... H02K 5/1672
310/71
5,625,244 A * 4/1997 Bradfield ............ H02K 13/003
310/232

(Continued)

FOREIGN PATENT DOCUMENTS

JP    2000-077150 A    3/2000
JP    2002-335664 A   11/2002
(Continued)

OTHER PUBLICATIONS

International Search Report for PCT/KR2016/003351 dated Jul. 18, 2016 from Korean Intellectual Property Office.

*Primary Examiner* — Naishadh N Desai
(74) *Attorney, Agent, or Firm* — Revolution IP, PLLC

(57) ABSTRACT

An embodiment of the present invention provides an actuator module which can be equipped with a motor, a reduction gear and a control circuit, the actuator module comprising: a first housing which can have an active shaft, connected to a motor, pass through and be coupled thereto; and a second housing which is coupled to the first housing and has a passive idler horn, provided in a position in correspondence with the active shaft, pass through and be coupled thereto, wherein the idler horn has interposed a tube-shaped bearing, having a hollow portion formed in the center thereof, is coupled to a side of the second housing, and can have a cable connected into the second housing through the hollow portion of the tube-shaped bearing.

8 Claims, 9 Drawing Sheets

(51) Int. Cl.
| | |
|---|---|
| *H02K 7/116* | (2006.01) |
| *H02K 11/30* | (2016.01) |
| *B25J 9/10* | (2006.01) |
| *B25J 9/12* | (2006.01) |
| *H01R 13/639* | (2006.01) |
| *B25J 9/08* | (2006.01) |
| *B25J 19/00* | (2006.01) |
| *H01R 13/58* | (2006.01) |
| *H02K 7/08* | (2006.01) |

(52) U.S. Cl.
CPC ........ *B25J 19/0029* (2013.01); *H01R 13/639* (2013.01); *H02K 7/003* (2013.01); *H02K 7/116* (2013.01); *H02K 11/30* (2016.01); *H01R 13/5804* (2013.01); *H02K 7/085* (2013.01); *Y10S 901/23* (2013.01); *Y10S 901/25* (2013.01)

(58) Field of Classification Search
CPC ..... H02K 7/085; B25J 9/10; B25J 9/12; B25J 19/0029; B25J 9/102; B25J 9/08; B25J 9/126; H01R 13/639; H01R 13/5804; H01R 13/58; Y10S 901/23; Y10S 901/25
USPC ........................................ 310/71, 89, 90, 91
See application file for complete search history.

(56) References Cited

U.S. PATENT DOCUMENTS

| | | |
|---|---|---|
| 2011/0241484 A1 | 10/2011 | Okada et al. |
| 2011/0298343 A1* | 12/2011 | Kim .................. H05K 5/0008 312/223.6 |

FOREIGN PATENT DOCUMENTS

| | | |
|---|---|---|
| KR | 10-2010-0123176 A | 11/2010 |
| KR | 10-2013-0018402 A | 2/2013 |
| KR | 10-2014-0043472 A | 4/2014 |
| WO | 2011-125579 A1 | 10/2011 |

* cited by examiner

- Conventional Art -

ACTUATOR MODULE

TECHNICAL FIELD

The present invention relates to an actuator module, and more particularly, to an actuator module including a motor and a reduction gear and having an improved wire (cable) connection structure to resolve an entanglement problem of the wire when coupled to another actuator module, a module connection member, or the like.

BACKGROUND ART

Actuator modules generally include a drive device (a motor) and a reduction gear, and are widely used for general industrial use as well as for home and educational use. Specifically, that a plurality of actuator modules may be coupled to implement an articulated robot capable of performing complicated operations has been receiving more attention lately.

FIG. 1 is an actual photograph illustrating a humanoid type articulated robot which is implemented by coupling standardized actuator modules and connection members thereof (see Korean Patent Application Publication No. 10-2013-0018402). In such a robot, each of the actuator modules should be controlled according to predetermined rules, and to this end, all the actuator modules should be connected to wires for power and signal transmission.

FIG. 2 illustrates a state in which an actuator module (at a lower side) and a module connection member (at an upper side) are coupled to each other. A plurality of actuator modules are necessarily connected to module connection members on the basis of an active shaft of each of the plurality of actuator modules, and a coupling structure of the plurality of actuator modules and the module connection members is repeated such that a robot having a form shown in FIG. 1 or desired by a manufacturer can be manufactured.

Wire arrangement is important in connecting an actuator module to a module connection member or another actuator module. Specifically, when a plurality of actuator modules are controlled by a central processing unit or a central controller, a plurality of wires for controlling and sensing are required, and the arrangement of these wires should not interfere with the driving of each of the plurality of actuator modules. Further, when the wires are complicatedly entangled, an exterior is poor.

Specifically, when the number of actuator modules constituting the robot increases, difficulty of wire arrangement becomes more serious such that problems may occur in which a driving range of the actuator is limited, a structure of a robot cannot be varied, and the like.

In the actuator module shown in FIGS. 1 and 2, a protruding structure having through-holes through which wires may pass is provided at respective side surfaces of a housing constituting an outer surface of the actuator module, but even when such a structure is used, the driving range (a pivot range) may still be limited and the protruding structure may act as an obstacle when a plurality of actuator modules are connected. Further, an exterior may give an untidy impression. In the case of the humanoid type robot shown in FIG. 1, it can be seen that the wires connected from arms or legs to the outside may interfere with the driving of the robot.

Meanwhile, the wire arrangement problem of the actuator module has been described above by exemplification as a home or educational robot, but all actuator modules inevitably have such a problem, whether the problem is major or minor. Accordingly, an improved type of module structure capable of resolving a wire arrangement problem of an actuator module is required.

DISCLOSURE

Technical Problem

It is an objective of the present invention to provide a module structure capable of resolving a wire arrangement problem of an actuator module.

It should be understood that objectives of the present invention are not limited to the above-described objectives, and a person skilled in the art can apparently understand another objective of the present invention, which are not mentioned above, from the following description.

Technical Solution

To achieve the above-described objectives, an embodiment of the present invention provides an actuator module, which allows a motor, a reduction gear, and a control circuit to be included therein, the actuator module including a first housing which an active shaft connected to the motor is coupled to and passes through; and a second housing coupled to the first housing and which a passive idler horn provided at a position corresponding to the active shaft is coupled to and passes through, wherein the idler horn is coupled to one surface of the second housing with a tube-shaped bearing having a central portion, in which a hollow portion is formed, and interposed therebetween, and a cable is extendable to an interior of the second housing through the hollow portion of the tube-shaped bearing.

A terminal portion connectable to a connector of one ends of the cables may be provided at a side surface of the first housing.

A pass-through portion may be provided at a side surface of the second housing, and the cables connected to the terminal portion through the pass-through portion may be extendable to the interior of the second housing.

In the embodiment of the present invention, the terminal portion may be provided on each of both side surfaces of the first housing.

In the embodiment of the present invention, the second housing may include an upper end portion at which the idler horn is installed; a lower end portion provided to have a height the same as a height of the upper end portion; and a connection portion for upper and lower ends provided between the upper end portion and the lower end portion and recessed inward.

In the embodiment of the present invention, the actuator module may further include a cover installed and coupled around the connection portion for the upper and lower ends, and having a side surface protrusion configured to prevent the falling off of the connector of the one ends of the cables connected to the terminal portion.

In the embodiment of the present invention, the active shaft and the passive idler horn may be coaxially provided.

Advantageous Effects

In accordance with the embodiment of the present invention, a module structure capable of resolving a wire arrangement problem of an actuator module can be provided. Such a module structure can prevent problems of entanglement and short circuiting of wires, and reduce a communication failure problem. Further, an aesthetically pleasing exterior of the actuator module can be improved. Such an effect is specifically useful when an articulated robot is manufactured by repeatedly coupling a plurality of actuator modules.

It should be understood that effects of the present invention are not limited to the above-described effect, and include all effects that can be deduced from the detailed description of the present invention or the configuration thereof defined by the appended claims.

DESCRIPTION OF REFERENCE NUMERALS

Figure 1:
FIG. 1 is a photograph illustrating a humanoid type articulated robot using a conventional actuator module.
Figure 2:
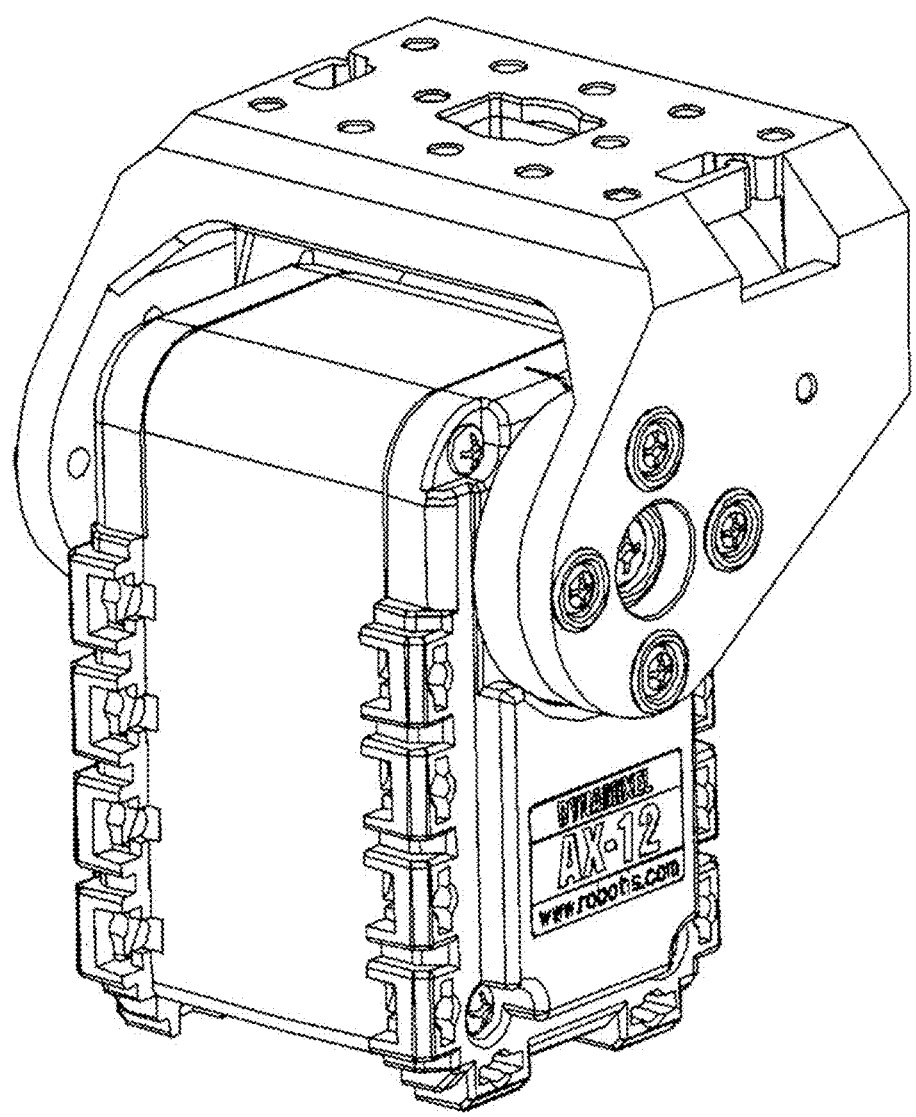
FIG. 2 is a diagram illustrating a state in which the conventional actuator module and a module connecting member are coupled.

1: actuator module
10: first housing
20: second housing
30: active shaft
40: passive idler horn
50: tube-shaped bearing
60: cover
100: cable
200: module connection member

MODES OF THE INVENTION

Hereinafter, the present invention will be described with reference to the accompanying drawings. The present invention, however, may be implemented in various different forms, and thus it is not limited to embodiments which will be described below. In the drawings, some portions not related to the description will be omitted in order to clearly describe the present invention, and similar reference numerals are given to similar components throughout the present invention.

Throughout the present invention, when a portion is referred to as being "connected" (accessed, contacted, or coupled) to other portion, it may include a case in which the portion is "directly connected" to the other portion as well, and a case in which the portion is "indirectly connected" to the other portion with another member interposed therebetween. Also, when a portion is referred to as "including" a component, it may mean that include another component is further included and is not to be excluded unless specifically stated otherwise.

Terms used herein are for the purpose of describing only specific embodiments and are not intended to be limiting of the present invention. Unless the context clearly dictates otherwise, the singular form includes the plural form. In the present invention, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Hereinafter, embodiments of the present invention will be described in detail with reference to the accompanying drawings.

Figure 3:
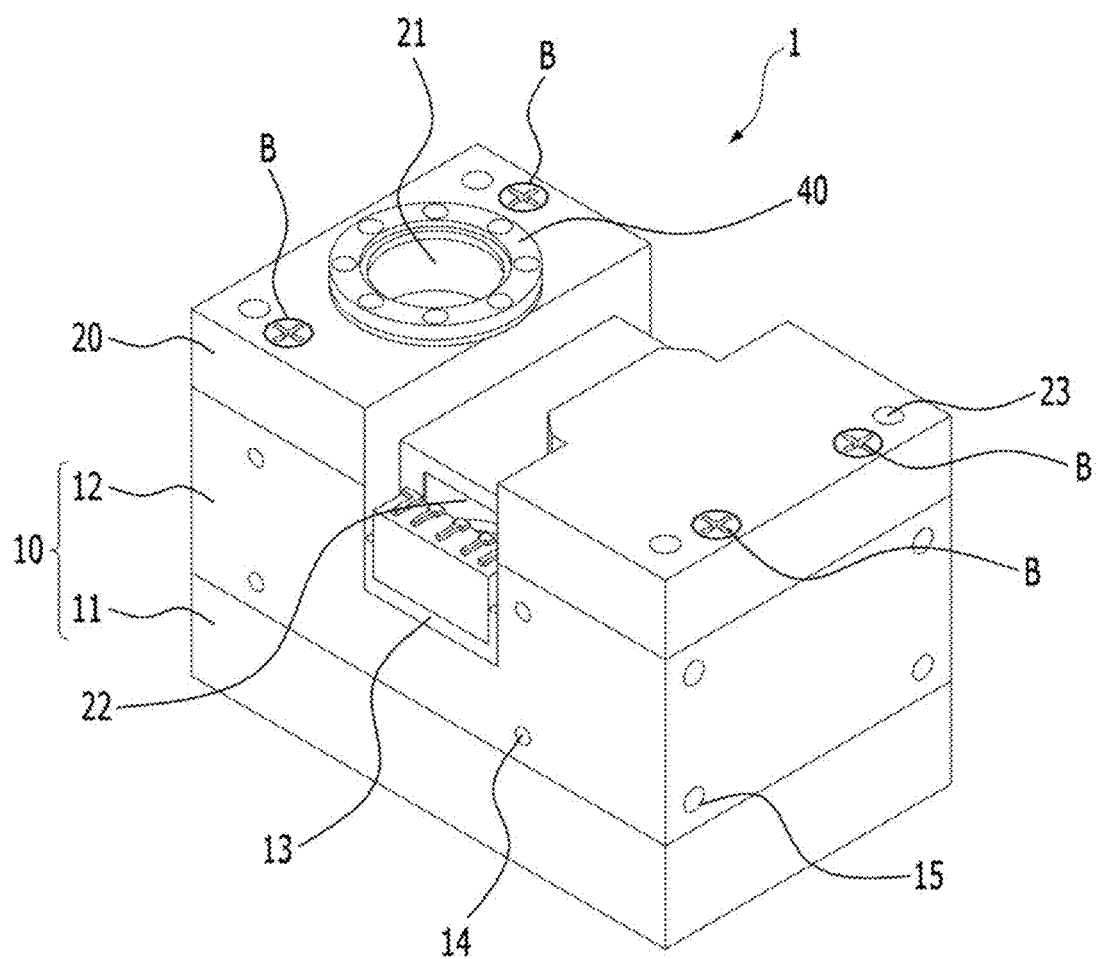
FIG. 3 is a schematic perspective view of an actuator module according to an embodiment of the present invention.
Figure 4:
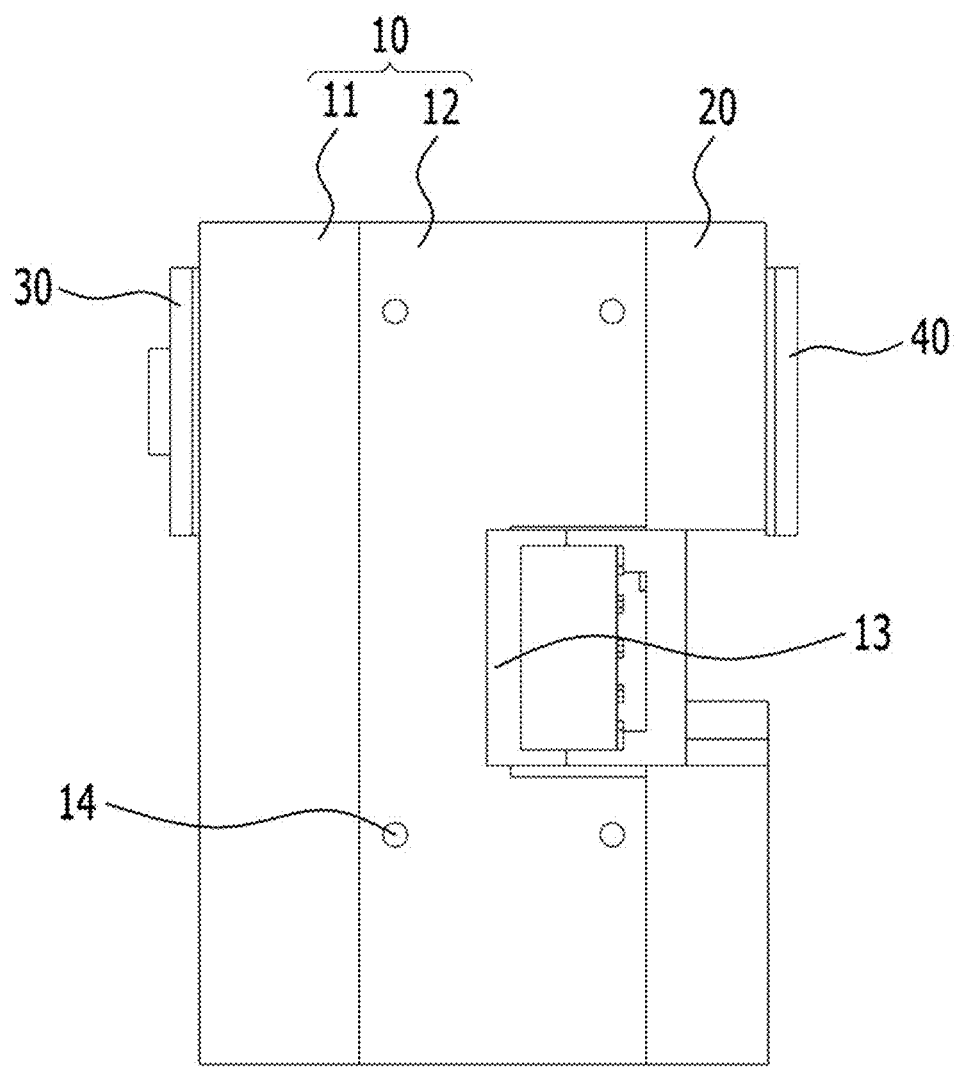
FIG. 4 is a side view of the actuator module according to the embodiment of the present invention.

FIG. 3 is a schematic perspective view of an actuator module according to an embodiment of the present invention, and FIG. 4 is a side view of the actuator module according to the embodiment of the present invention.

As shown in the drawings, an actuator module 1 includes a first housing 10 and a second housing 20. Here, an actuator is a device configured to operate a machine or a mechanism using power, and is generally implemented using an electric motor. The actuator module includes a reduction gear together with a motor as a driving portion, and includes control circuits for the reduction gear and the motor.

The first housing 10 and the second housing 20 are collectively referred to as a housing, and the housing constitutes an outer surface or an exterior of the actuator module and protects the motor, the reduction gear, the control circuits, and the like which are included inside the housing. A structure which is directly coupled to another actuator module or to a module connection member configured to connect to another actuator module may be formed at the housing.

An active shaft 30 connected to a motor (not shown) may be coupled to and pass through the first housing 10 (see FIG. 4). That is, the shaft 30 receiving a driving force through the motor provided inside the actuator module 1 is installed at one surface of the first housing 10. A structure connectable to an external member, e.g., a coupling recess or a horn structure, may be integrally or detachably installed at the shaft 30. A reduction gear may be provided between the actuator motor and the shaft 30.

The first housing 10 may be formed as one body, and alternatively, may be configured as detachable sub-housings. For example, as shown in the drawings, the first housing 10 may include a first sub-housing 11 and a second sub-housing 12. For example, the reduction gear may be provided inside the first sub-housing 11 and the motor may be provided inside the second sub-housing 12. Such a separable structure of the first housing 10 allows a more efficient partitioning of an inner space and facilitates assembly and disassembly.

Meanwhile, a terminal portion 13 may be provided at a side surface of the first housing 10. Cables 100 may be electrically connected to the terminal portion 13 (see FIG. 6), and a current may be supplied to the motor provided inside the actuator module 1 through the cables 100 and the terminal portion 13, or an electrical signal may be transmitted to or received from the control circuits provided inside the actuator module 1. Here, the signal which is transmitted and received through the control circuits may be a control signal for driving the motor or a sensed signal from a sensor provided inside the actuator module 1. A connector 110 may be installed at an end of the cable 100 and coupled to the terminal portion 13 (see FIG. 6).

The terminal portion 13 may be provided at both side surfaces of the first housing 10, and in this case, only one terminal portion 13 provided at either of the side surfaces may be used according to convenience of wire connection.

First coupling recesses 14 and 15 may be provided in an outer side surface of the first housing 10, that is, at one or more surfaces among side surfaces, a top surface, and a bottom surface of the first housing 10, for coupling to another actuator module or a module connection member. A female thread may be provided inside each of the first coupling recesses 14 and 15. As shown in the drawing, outer surfaces of the first housing 10 and the second housing 20 may be substantially formed as planar surfaces and screw (bolt) coupled to another actuator module or a module connection member through first coupling recesses 14 and 15.

The following descriptions will be made with reference back to FIGS. 3 and 4. The second housing 20 is coupled to the first housing 10. As shown in the drawings, the second housing 20 may be coupled to one surface of the first housing 10, i.e., to a surface opposite the surface through which the shaft 30 is formed to pass. The first housing 10 and the second housing 20 may be coupled by a bolt B, and the bolt B may be inserted through each of four bolt holes provided at one surface of the second housing 20 and be coupled to a female thread provided on an inner side surface of the first housing 10. The coupling between the first housing 10 and the second housing 20 may employ any other coupling including, for example, fitting through a concave-convex structure or the like, other structural couplings, or bonding, or the like.

Figure 7:
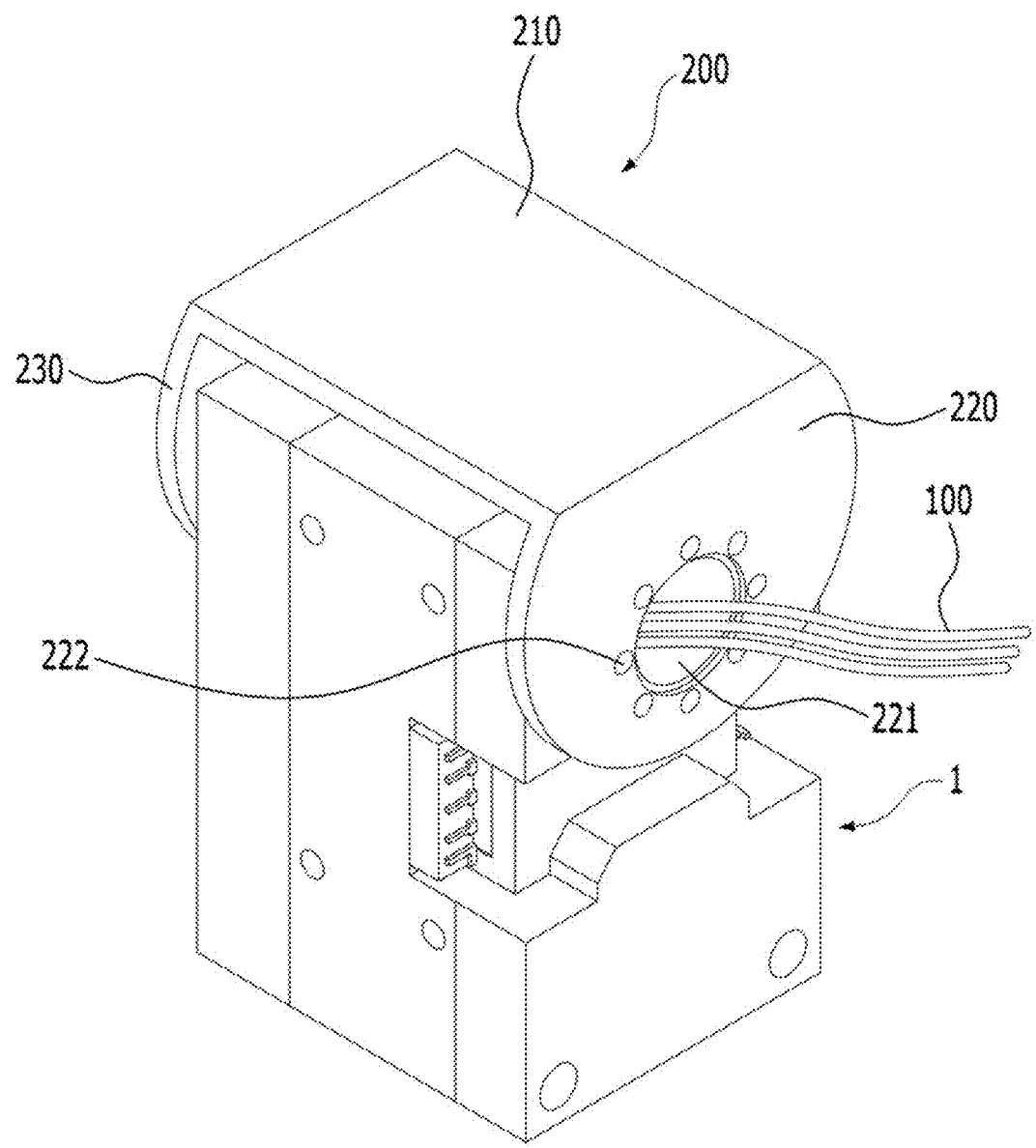
FIG. 7 is a perspective view illustrating a state in which a module connection member and the actuator module according to the embodiment of the present invention are coupled.

A passive idler horn 40 provided at a position corresponding to the active shaft 30 may be coupled to and pass through the second housing 20. That is, a second hollow portion 21 coaxial with the active shaft 30 may be provided at one surface of the second housing 20, and the idler horn 40 may be rotatably installed at the second hollow portion 21. The driving force from the motor provided inside the actuator module 1 is not transferred to the idler horn 40, and the idler horn 40 merely serves to support another member when the active shaft 30 transfers the driving force to another member. Referring to FIG. 7 in advance, when the actuator module 1 is connected to another member, i.e., a module connection member 200, the idler horn 40 supports the module connection member 200, and a detailed description thereof will be provided below.

A pass-through portion 22 may be provided in a side surface of the second housing 20. The cables 100 connected to the terminal portion 13 through the pass-through portion 22 may be connected to an inner side of the second housing 20. Meanwhile, since foreign materials and the like may flow inside the housing through the pass-through portion 22 while the pass-through portion 22 is not being used, a cover member (not shown) configured to block the pass-through portion 22 may be provided at the pass-through portion 22. Alternatively, the pass-through portion 22 may be formed when the cover member is removed from the second housing 20.

A second coupling recess 23 may be provided at a front surface of the second housing 20. Like the first coupling recesses 14 and 15, the second coupling recess 23 is provided to couple to another actuator module or a module connection member. Further, a female thread may be provided inside the second coupling recess 23.

The idler horn 40 may be coupled to one surface of the second housing 20 with a tube-shaped bearing 50 having a central portion, in which a hollow portion 53 is formed, and interposed therebetween. Further, the cables 100 may be inserted into the second housing 20 through the hollow portion 53 of the tube-shaped bearing 50. A description thereof will be provided with reference to FIGS. 5 and 6.

Figure 5:
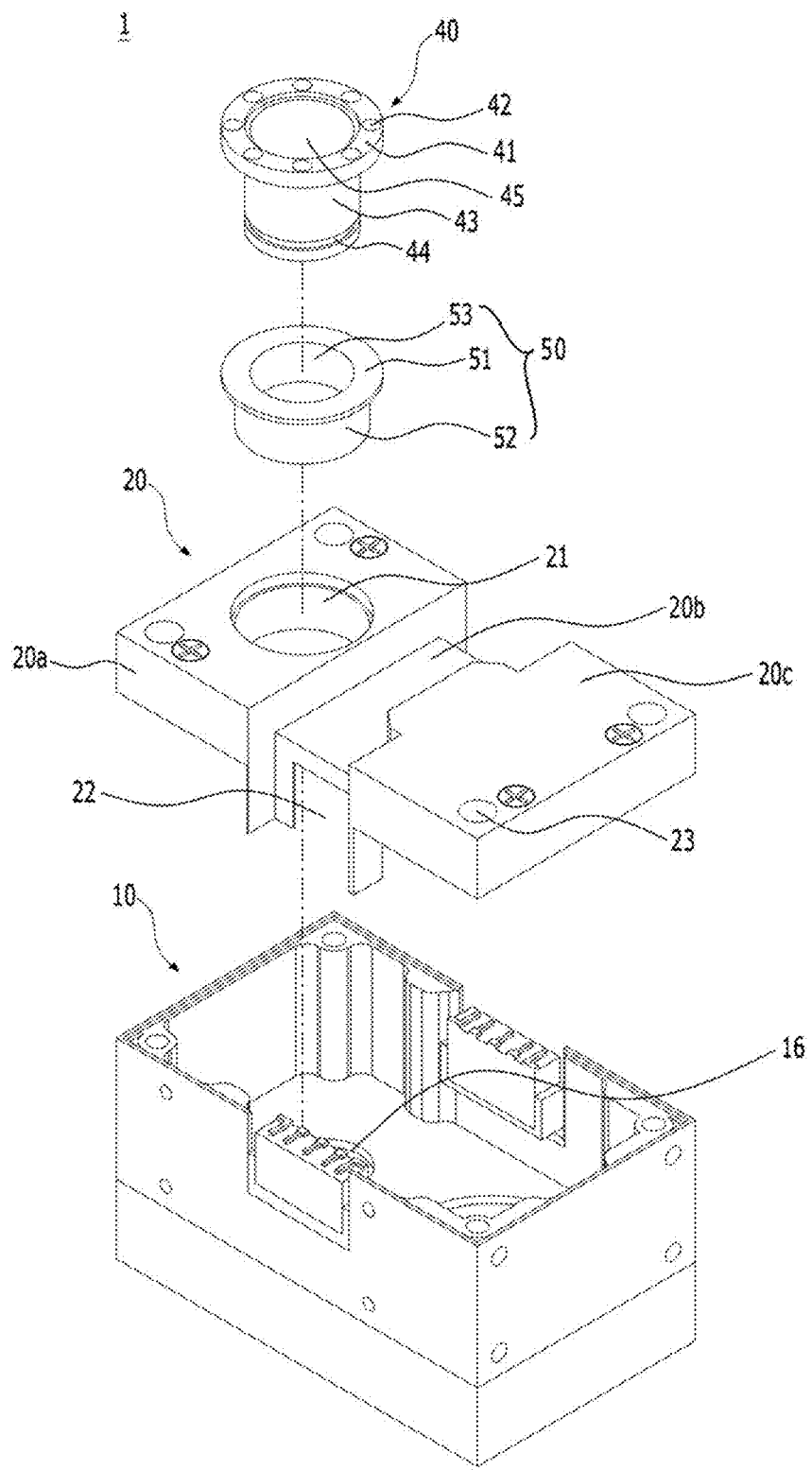
FIG. 5 is an exploded perspective view of the actuator module according to the embodiment of the present invention.
Figure 6:
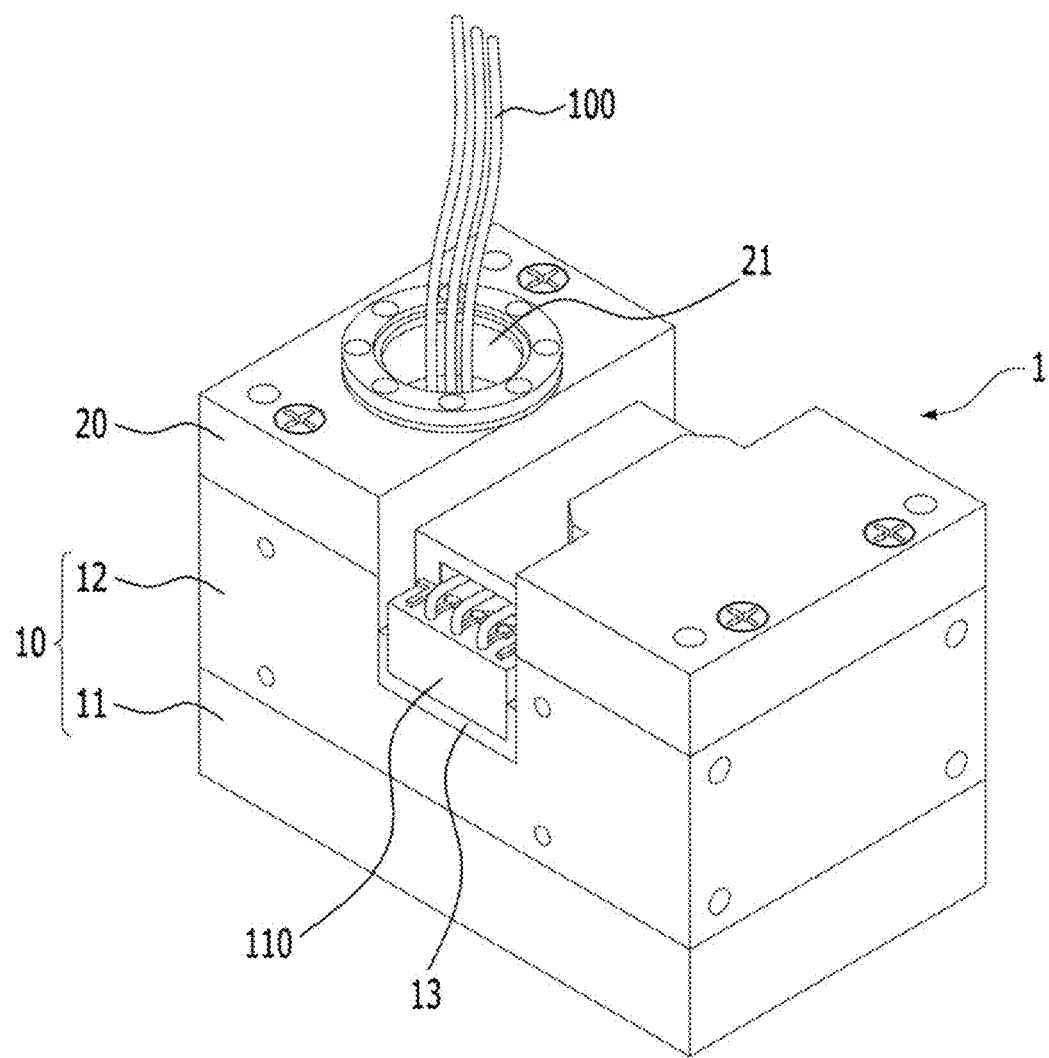
FIG. 6 is a schematic perspective view illustrating a state in which cables are connected to the actuator module according to the embodiment of the present invention.

FIG. 5 is an exploded perspective view of the actuator module according to the embodiment of the present invention, and FIG. 6 is a schematic perspective view illustrating a state in which cables are connected to the actuator module according to the embodiment of the present invention.

As shown in the drawings, a first hollow portion 16 is installed at the first housing 10 to allow the active shaft 30 to be installed, and in correspondence with the first hollow portion 16 of the first housing 10, the second hollow portion 21 is provided at the second housing 20 to allow the passive idler horn 40 to be installed. With such a configuration, the active shaft 30 and the passive idler horn 40 may be coaxially provided.

As shown in the drawings, the idler horn 40 may be coupled to one surface of the second housing 20 with the tube-shaped bearing 50 interposed therebetween.

The idler horn 40 may include a flange 41 having a coupling hole 42, and a cylindrical portion 43 installed to protrude from the flange 41 toward a shaft. For example, the idler horn 40 may be fixed and coupled to another actuator module or a module connection member through the coupling hole 42 provided in the flange 41 (see FIG. 7).

A depressed portion 44 may be provided on an outer side of the cylindrical portion 43 in a circumferential direction thereof, and the idler horn 40 may be coupled, using the depressed portion 44, to an idler horn detaching device (not shown) provided inside the second housing 20. Further, an idler horn hollow portion 45 may be provided at a central interior portion of the idler horn 40.

The tube-shaped bearing 50 is inserted into the outer side of the cylindrical portion 43 of the idler horn 40 to allow the idler horn 40 to be rotated smoothly. The tube-shaped bearing 50 may include a bearing flange 51, and include a cylindrical bearing portion 52 installed to protrude from the bearing flange 51 toward the shaft. The bearing flange 51 may be in contact with the flange 41 of the idler horn 40, and may have a diameter that is less than that of the flange 41. The cylindrical bearing portion 52 may be inserted into and coupled to the outer side of the cylindrical portion 43 of the idler horn 40, and a length of the cylindrical bearing portion 52 may be formed to be shorter than that of the cylindrical portion 43 so as to allow the depressed portion 44 provided at the cylindrical portion 43 to be exposed to the outside.

The tube-shaped bearing 50 may be made of a resin. The tube-shaped bearing 50 made of a resin is used such that a smooth rotation of the idler horn 40 is ensured, maintenance is simplified, and economic feasibility is improved.

Referring to FIG. 5, the second housing 20 may include an upper end portion 20a, a lower end portion 20c, and a connection portion 20b for upper and lower ends provided between the upper end portion 20a and the lower end portion 20c. The second hollow portion 21 which the idler horn 40 may be coupled to and pass through may be formed on a front surface of the upper end portion 20a, and the lower end portion 20c may be formed to have a height substantially the same as a height of the upper end portion 20a. The connection portion 20b for upper and lower ends may be provided between the upper end portion 20a and the lower end portion 20c and be recessed inward. A cover 60 may be coupled to the connection portion 20b for upper and lower ends, and a description thereof will be provided below with reference to FIG. 8.

Referring to FIG. 6, the cables 100, which are inserted into the housing 20 through the second hollow portion 21 of the second housing 20 by passing through the idler horn 40 and the tube-shaped bearing 50, may be electrically connected to the terminal portion 13 provided at the housing 10 through the pass-through portion 22 formed at the side surface of the second housing 20. That is, the connector 110 provided at an end of the cable 100 may be coupled to the terminal portion 13, and a structure of a connector connection is well known and thus a detailed description thereof will be omitted.

With a wire (cable) connection structure according to the present invention, wires may be effectively connected to the outer side of the housing. According to user selection, the cables 100 connector-connected to the terminal portion 13 may be directly connected to the outer side of the housing without passing through the interior of the second housing 20, i.e., without passing through the second hollow portion 21, and as described above, the cables 100 may extend to the outside through the tube-shaped bearing 50 and the idler horn 40 via the interior of the second housing 20. Specifically, when the cables 100 pass through the tube-shaped bearing 50 and the idler horn 40, the cables 100 do not affect driving of the idler horn 40, such that disconnection is prevented, and an entanglement does not occur.

FIG. 7 is a perspective view illustrating a state in which a module connection member and the actuator module according to the embodiment of the present invention are coupled. As shown in the drawing, the module connection member 200 may include a main body 210, and include a first vertical portion 220 and a second vertical portion 230 vertically installed at both side surfaces of the main body 210. A third hollow portion 221 and a screw hole 222 around the third hollow portion 221 may be provided at the first vertical portion 220, and the screw hole 222 and the coupling hole 42 of the idler horn 40 may be coupled by a bolt. The third hollow portion 221 is formed at a position corresponding to the second hollow portion 21 of the second housing 20. A hollow portion and a screw hole, which are not shown, may also be provided at the second vertical portion 230, and similar to the vertical portion 220, the second vertical portion 230 may be coupled to the active shaft 30.

As shown in FIG. 7, the cables 100 may extend to the outside through the second hollow portion 21 of the second housing 20 and the third hollow portion 221 of the module connection member 200, even when the actuator module 1 is coupled to the module connection member 200, such that an entanglement of the cables 100 does not occur even when the module connection member 200 is rotated according to the driving of the actuator module 1. Further, a rotational movement of the module connection member 200 is not hindered by the cables 100.

As described above, the cables 100 are extendable to the interior of the housing. Alternatively, when a pivotal range of the other actuator module or the module connection member is small, or only a simplified arrangement of the wires is sufficient, the cables 100 may be directly connected to the outer side of the housing from the terminal portion 13 without passing through the interior of the housing. Even in this case, the cover 60 may be used to prevent the cables 100 from easily becoming loose and make the cables 100 have an organized exterior. A description thereof will be given with reference to FIGS. 8 and 9.

Figure 8:
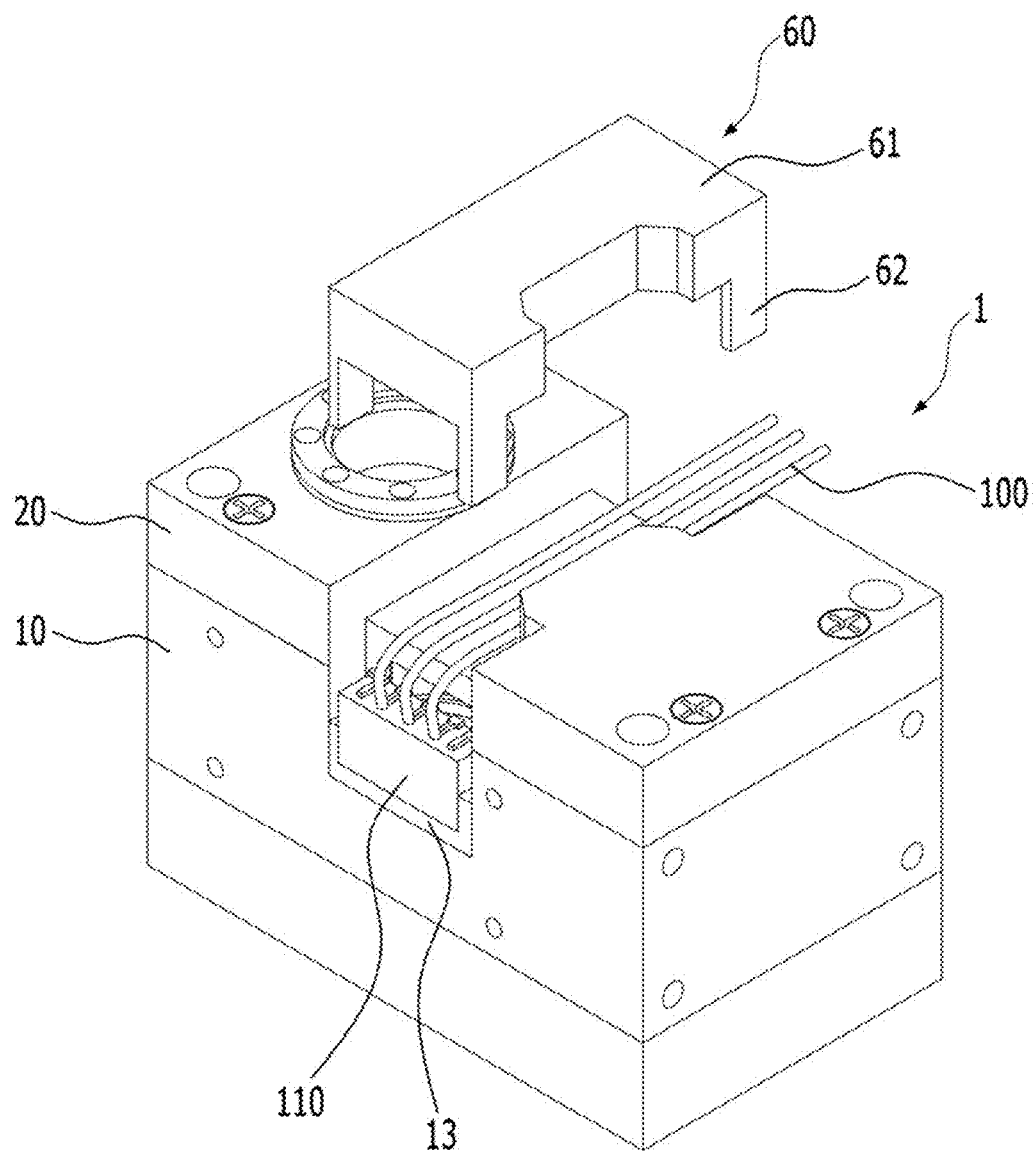
FIG. 8 is an exploded perspective view illustrating a cover and the actuator module according to the embodiment of the present invention.
Figure 9:
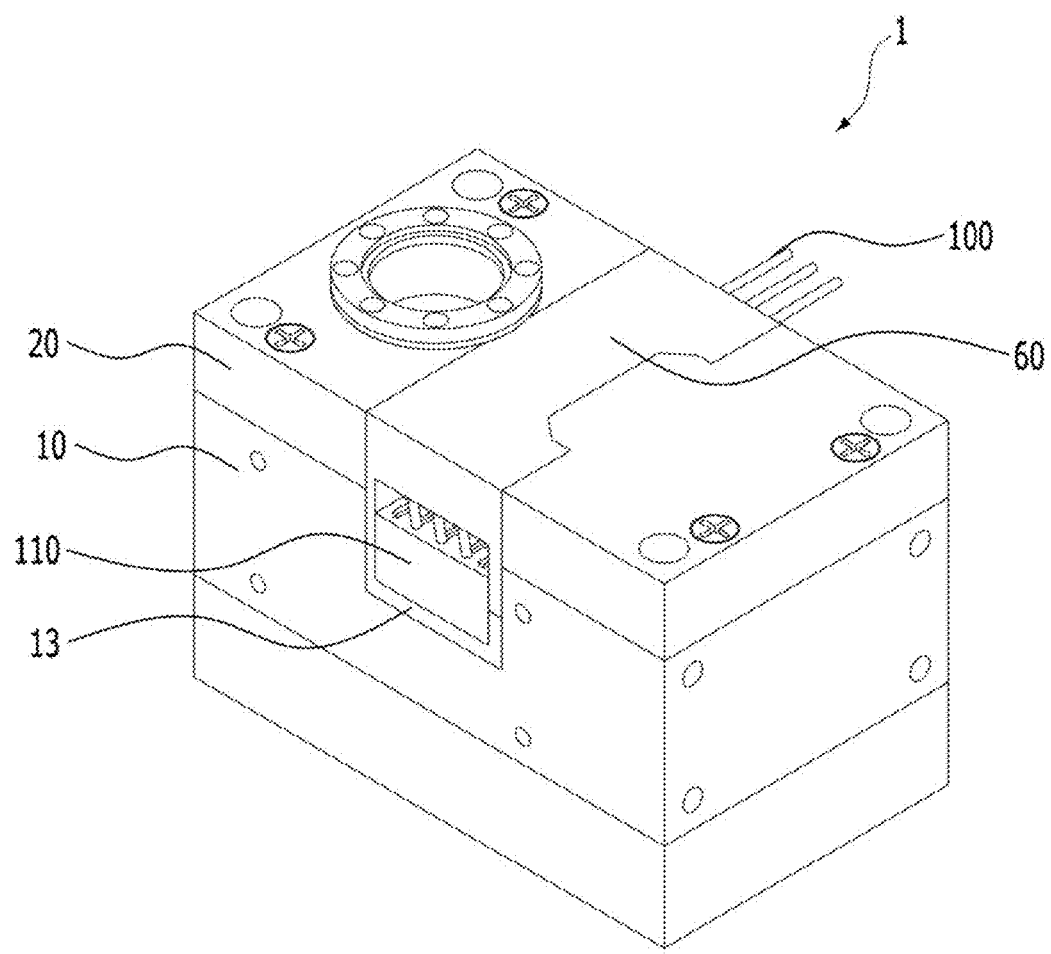
FIG. 9 is a perspective view illustrating a state in which the cover and the actuator module according to the embodiment of the present invention are coupled.

FIG. 8 is an exploded perspective view illustrating the cover and the actuator module according to the embodiment of the present invention, and FIG. 9 is a perspective view illustrating a state in which the cover and the actuator module according to the embodiment of the present invention are coupled.

As shown in the drawings, the cover 60 is coupled around the connection portion 20b for upper and lower ends of the second housing 20 to form a part of the outer surface of the second housing 20. The cover 60 includes a cover main body 61 of a rectangular shape, and a side surface protrusion 62 installed to vertically protrude from each of corners of the cover main body 61. When the cover 60 is coupled to the second housing 20, the side surface protrusion 62 of the cover 60 is brought into contact with the connector 110 provided at the end of the cable 100 connected to the terminal portion 13 such that the connector 110 is prevented from falling off from the terminal portion 13.

The cables 100 connected to the terminal portion 13 may extend to the interior of the housing through the pass-through portion 22 of the second housing 20 and then to the outside through the second hollow portion 21 of the second housing 20, and alternatively, as shown in FIGS. 8 and 9, the cables 100 may extend to the outside through an interior of the cover 60.

Meanwhile, when the cables 100 do not pass through the second hollow portion 21 of the second housing 20, a cover member (not shown) configured to block the second hollow portion 21 may be installed to prevent foreign materials from flowing into the housing through the second hollow portion 21.

Using the housing structure of the actuator module according to the present invention, a user may extend the wires of the actuator module to the interior of the housing through the idler horn such that an entanglement of the wires can be prevented, a communication failure can be reduced, and an aesthetically pleasing exterior of the actuator module can be improved. Specifically, when an articulated robot is manufactured by connecting another actuator module or a module connecting member to the actuator module, freedom of design can be increased, and the actuator can be smoothly driven due to the above-described wire arrangement.

The above-described description of the present invention is intended only for an illustrative purpose, and it can be easily understood that other concrete forms can be devised by those skilled in the art without changing or modifying the technical spirit or essential characteristics of the present invention. Therefore, it should be understood that the above-described embodiments are not restrictive but illustrative in all aspects. For example, each component described as a single form may be distributed and implemented, and similarly, components described as being distributed may also be implemented in a combined form.

The scope of the present invention is defined by the appended claims, and all alternations or modifications derived from the meaning and scope of the claims and their equivalents should be construed as being included within the scope of the present invention.

The invention claimed is:

1. An actuator module, which allows a motor, a reduction gear, and a control circuit to be included therein, the actuator module comprising:
   a first housing which an active shaft connected to the motor is coupled to and passes through; and
   a second housing coupled to the first housing, wherein a passive idler horn provided at a position corresponding to the active shaft is coupled to and passes through the second housing, the passive idler horn being coupled to one surface of the second housing, wherein the passive idler horn is coupled to a tube-shaped bearing having a central portion formed with a hollow portion and interposed therebetween, and wherein a cable is extendable to an interior of the second housing through the hollow portion of the tube-shaped bearing.

2. The actuator module of claim 1, wherein a terminal portion is provided at a side surface of the first housing and configured to connect a connector of an end of the cable.

3. The actuator module of claim 2, wherein:

a pass-through portion is provided in a side surface of the second housing; and the cable connected to the terminal portion through the pass-through portion is extendable to the interior of the second housing.

4. The actuator module of claim 2, wherein the terminal portion is provided on each of both side surfaces of the first housing.

5. The actuator module of claim 2, wherein the second housing includes:

an upper end portion at which the idler horn is installed;

a lower end portion provided to have the same height as the upper end portion; and a connection portion for upper and lower ends provided between the upper end portion and the lower end portion and recessed inward.

6. The actuator module of claim 5, further comprising a cover installed and coupled around the connection portion for the upper and lower ends, and having a side surface protrusion configured to prevent a falling off of the connector of the end of the cable connected to the terminal portion.

7. The actuator module of claim 1, wherein the active shaft and the passive idler horn are coaxially provided.

8. The actuator module of claim 1, wherein the tube-shaped bearing is made of a resin.

* * * * *